United States Patent
Chakravarty et al.

(10) Patent No.: US 11,532,098 B2
(45) Date of Patent: Dec. 20, 2022

(54) DETERMINING MULTI-DEGREE-OF-FREEDOM POSE TO NAVIGATE A VEHICLE

(71) Applicant: Ford Global Technologies, LLC, Dearborn, MI (US)

(72) Inventors: Punarjay Chakravarty, Campbell, CA (US); Chandana Neerukonda, Hamtramck, MI (US); Sagar Manglani, Mountain View, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 45 days.

(21) Appl. No.: 17/009,153

(22) Filed: Sep. 1, 2020

(65) Prior Publication Data
US 2022/0067956 A1    Mar. 3, 2022

(51) Int. Cl.
*G06T 7/73* (2017.01)
*G06T 7/60* (2017.01)
*G06N 3/04* (2006.01)

(52) U.S. Cl.
CPC ............. *G06T 7/73* (2017.01); *G06N 3/0454* (2013.01); *G06T 7/60* (2013.01); *G06T 2207/10028* (2013.01); *G06T 2207/30252* (2013.01)

(58) Field of Classification Search
CPC ... G06T 7/73; G06T 7/60; G06T 2207/10028; G06T 2207/30252; G06N 3/0454
USPC ........................................................ 382/103
See application file for complete search history.

(56) References Cited

U.S. PATENT DOCUMENTS

| | | | |
|---|---|---|---|
| 5,529,337 A | 6/1996 | Takeda et al. | |
| 7,631,891 B2 | 12/2009 | Washino | |
| 9,845,067 B2 | 12/2017 | Morris et al. | |
| 10,528,823 B2* | 1/2020 | Guo | G06V 20/588 |
| 10,723,281 B1* | 7/2020 | Briggs | G01S 7/4972 |
| 10,780,861 B2* | 9/2020 | Herman | G06T 7/246 |
| 10,854,011 B2* | 12/2020 | Tay | G05D 1/0044 |
| 10,949,684 B2* | 3/2021 | Jaipuria | G06T 7/593 |
| 10,982,968 B2* | 4/2021 | Elangovan | G01C 21/3647 |
| 11,061,122 B2* | 7/2021 | Ma | G06K 9/6274 |
| 11,100,384 B2* | 8/2021 | Finkelstein | G06N 5/04 |
| 11,105,905 B2* | 8/2021 | Briggs | G06T 7/73 |
| 11,130,382 B2* | 9/2021 | Nong | B60G 17/0195 |
| 11,144,889 B2* | 10/2021 | Li | G06N 20/20 |
| 2006/0163848 A1 | 7/2006 | Abe | |

FOREIGN PATENT DOCUMENTS

| | | | | |
|---|---|---|---|---|
| JP | H11245759 A | 9/1999 | | |
| JP | 200894224 A | 4/2008 | | |
| WO | WO2021221704 | * 11/2021 | ............... | G06T 7/00 |

\* cited by examiner

*Primary Examiner* — Jerome Grant, II
(74) *Attorney, Agent, or Firm* — Frank A. MacKenzie; Bejin Bieneman PLC

(57) ABSTRACT

An imaging system and method of providing localization data to a vehicle using the imaging system is disclosed. The method may comprise: capturing, from an electronic depth camera, one or more images, wherein the one or more images include at least a portion of the vehicle; and using a deep neural network and the one or more images, determining a multi-degree of freedom (MDF) pose of the vehicle, wherein an optical axis of the electronic depth camera is oriented along a Z-axis according to a Cartesian coordinate system (comprising an X-axis, a Y-axis, and the Z-axis), wherein the Z-axis is plumb with respect to Earth.

20 Claims, 6 Drawing Sheets

DETERMINING MULTI-DEGREE-OF-FREEDOM POSE TO NAVIGATE A VEHICLE

BACKGROUND

Autonomous vehicles can execute computer-controlled steering and speed-control based on sensor input. Among other things, the vehicle may use GPS data to determine a navigation path. In the absence of GPS data, the vehicle may cease autonomous operation due to a lack of information regarding its surroundings.

DETAILED DESCRIPTION

Figure 1:
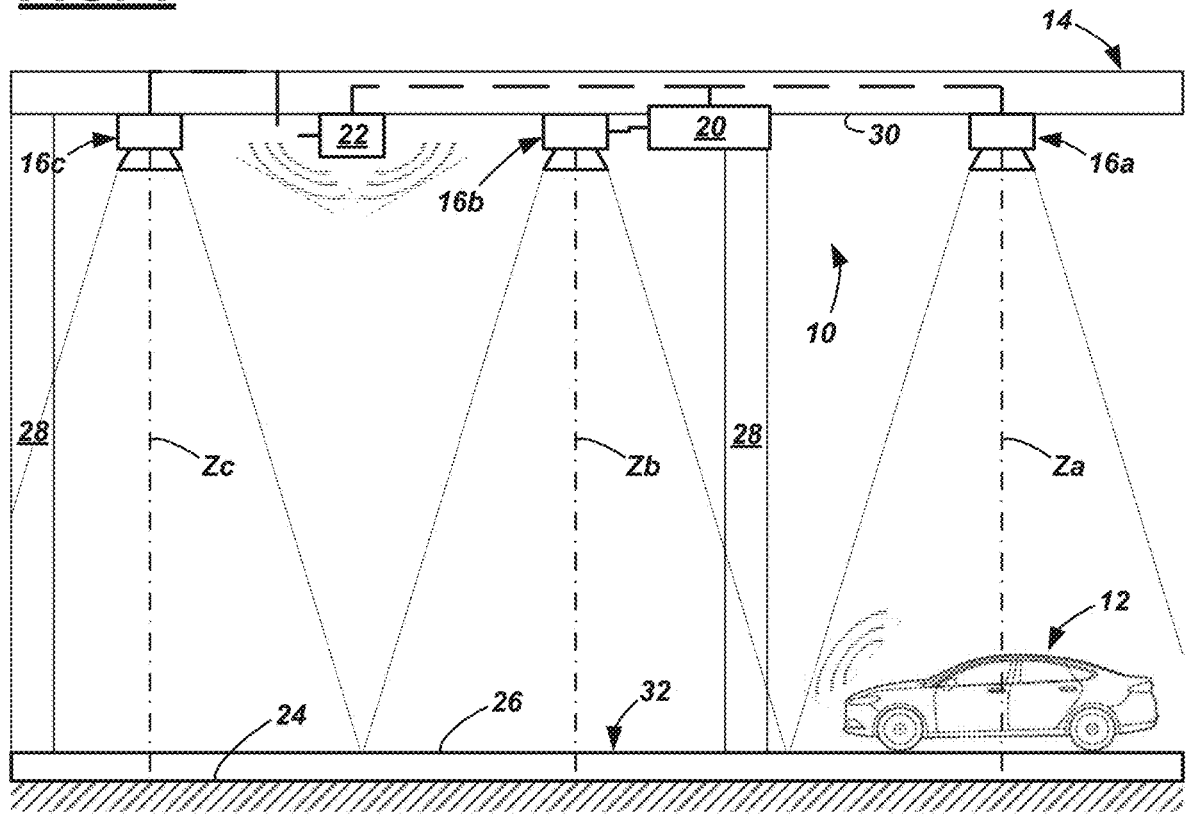
FIG. 1 is a schematic diagram of a structure comprising an imaging system that is used to assist with vehicle navigation.
Figure 2:
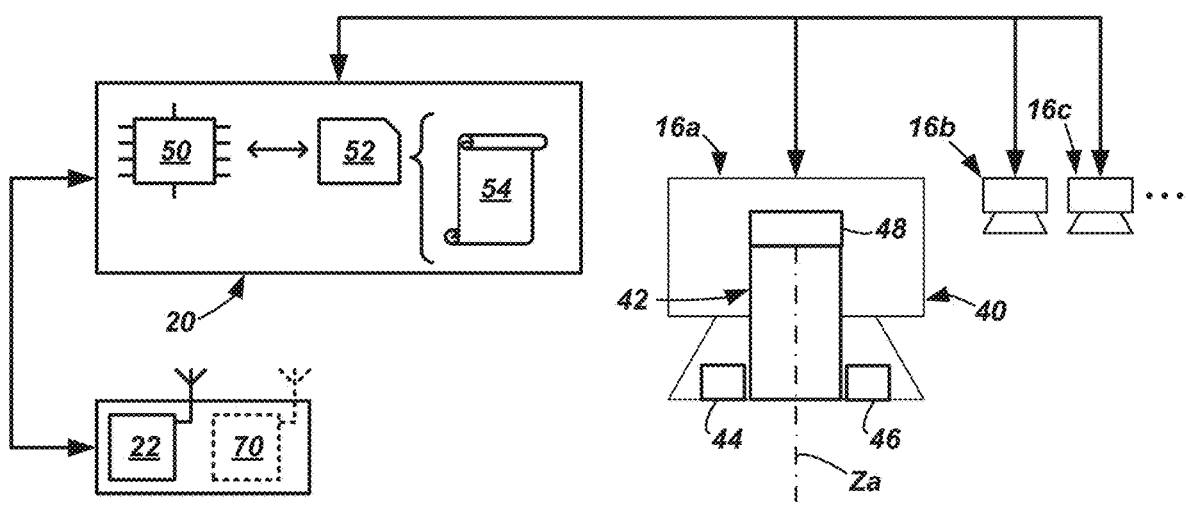
FIG. 2 is a schematic diagram of exemplary components of the imaging system of FIG. 1, the components including a plurality of electronic depth cameras, at least one computer that receives camera data from the plurality of electronic depth and uses the camera data to determine navigation data for a vehicle, and a wireless transceiver that is used for communication between the vehicle and computer.

An imaging system and method of providing localization data to a vehicle using the imaging system is disclosed. The method may comprise: capturing, from an electronic depth camera, one or more images, wherein the one or more images include at least a portion of the vehicle; and using a deep neural network and the one or more images, determining a multi-degree of freedom (MDF) pose of the vehicle, wherein an optical axis of the electronic depth camera is oriented along a Z-axis according to a Cartesian coordinate system (comprising an X-axis, a Y-axis, and the Z-axis), wherein the Z-axis is plumb with respect to Earth.

According to the method example set forth above and/or according to any of the other examples set forth above, the method further comprising determining an indication of a weak satellite-based positioning signal or an absence thereof, wherein determining the indication comprises receiving a request for the localization data from the vehicle.

According to the method example set forth above and/or according to any of the other examples set forth above, the method further comprising sending a command to the vehicle to navigate to a new waypoint.

According to the method example set forth above and/or according to any of the other examples set forth above, the camera is a red-green-blue-depth (RGBD) camera.

According to the method example set forth above and/or according to any of the other examples set forth above, the deep neural network is a convolutional neural network (CNN).

According to the method example set forth above and/or according to any of the other examples set forth above, an input layer of the CNN receives the one or more images, wherein an output layer of the CNN yields the MDF pose.

According to the method example set forth above and/or according to any of the other examples set forth above, the MDF pose comprises an x-component (x), a y-component (y), a z-component (z), a pitch component ($\theta$), a roll component ($\phi$), and a yaw component ($\psi$), wherein the x-, y-, and z-components are translations according to a Cartesian coordinate system (comprising an X-axis, a Y-axis, and a Z-axis) and the roll, pitch, and yaw components are rotations about X-, Y-, and Z-axes, respectively.

According to the method example set forth above and/or according to any of the other examples set forth above, wherein determining the MDF pose further comprises determining a centroid of volume of the vehicle using the one or more images, wherein the centroid of volume is a geometric center of a body of the vehicle.

According to the method example set forth above and/or according to any of the other examples set forth above, wherein determining the MDF pose further comprises determining a current waypoint of the vehicle.

According to the method example set forth above and/or according to any of the other examples set forth above, the command to navigate is determined based the current waypoint and a new waypoint, wherein the new waypoint is based on a predetermined vehicle route through the structure.

According to the method example set forth above and/or according to any of the other examples set forth above, further comprising calculating, using the centroid of volume, a center of a two-dimensional (2D) projection of the vehicle onto the floor of the structure and assigning a location of the center to be the current waypoint.

According to the method example set forth above and/or according to any of the other examples set forth above, wherein a new waypoint is based on an absence of interference of the 2D projection with obstacles within a field of view of the electronic depth camera.

According to the method example set forth above and/or according to any of the other examples set forth above, the method further comprising handing off the vehicle to a second electronic depth camera in the structure which has a field of view that is different than the first electronic depth camera, wherein the first electronic depth camera determines the MDF pose (using the deep neural network) independent from the second electronic depth camera determining (using the deep neural network) a new MDF pose.

According to the method example set forth above and/or according to any of the other examples set forth above, the method further comprising repeating the capturing, determining, and sending steps.

According to the method example set forth above and/or according to any of the other examples set forth above, the method further comprising calculating the MDF pose of the vehicle based on a camera image, wherein the camera image includes data indicative of a fiducial marker positioned on an exterior surface of the vehicle; and assigning a label to a corresponding depth image, wherein the label comprises the calculated MDF pose of the vehicle.

According to at least one additional illustrative example, imaging system for guiding a vehicle is described. The system may comprise: a first red-green-blue-depth (RGBD) camera comprising a housing couplably fixed to a structure and an optical assembly carried by the housing, wherein an optical axis of the optical assembly is oriented normal to ground, wherein the first RGBD camera is located in a region that is absent a satellite-based positioning signal or the satellite positioning signal is attenuated less than a threshold, wherein the first RGBD camera is oriented along a vertical axis; a wireless transceiver; and a computer communicatively coupled to the first RGBD camera and the transceiver, wherein the computer comprises one or more processors and memory storing instructions executable by the one or more processors, wherein the instructions comprise to: (a) identify a vehicle to which to provide localization data; (b) capture, via the first RGBD camera, one or more image frames of the vehicle; (c) using a deep neural network and the one or more image frames of the RGBD camera, determine multi-degree of freedom (MDF) pose of the vehicle; (d) using the MDF pose, determine a new waypoint for the vehicle; and (e) transmitting, via the transceiver, a command to the vehicle to navigate to the new waypoint.

According to the at least one example set forth above, the satellite-based positioning signal comprises global positioning system (GPS) or global satellite navigation system (GLONASS), wherein the threshold is below a predetermined value.

According to the at least one example set forth above, the instructions further comprise to: using the MDF pose, determine a centroid of volume of the vehicle; and using the centroid of volume, determine the new waypoint for the vehicle, the centroid of volume is a geometric center of a body of the vehicle, wherein determining the centroid of volume is within an accuracy of less than 5 centimeters.

According to the at least one example set forth above, the imaging system further comprises a plurality of additional RGBD cameras, wherein, when the vehicle passes within the respective fields of view each of the first RGBD camera and the plurality of RGBD cameras, the one or more processors execute instructions (a)-(e).

A cross-modal supervision method for labeling depth data is disclosed. The method for cross-modal supervision may comprise: capturing, from a first electronic depth camera, a depth image and a red-green-blue image, wherein the depth image and a red-green-blue image includes at least a portion of a vehicle, wherein the red-green-blue image includes a depiction of fiducial marker positioned on an exterior surface of the vehicle; calculating a multi-degree of freedom (MDF) pose of the vehicle based on the red-green-blue image; assigning a label to the depth image, wherein the label comprises the calculated MDF pose of the vehicle; and training a deep neural network with the labeled depth image.

According to the method example set forth above and/or according to any of the other examples set forth above, the method further comprising training a deep neural network with the labeled depth image; receiving a non-labeled depth image; comparing the calculated MDF pose with an actual MDF pose of the vehicle; and updating one or more weights of the deep neural network based on the comparison; receiving a non-labeled depth image that includes at least a portion of a vehicle; and calculating a multi-degree of freedom (MDF) pose of the vehicle based on the non-labeled depth image; and sending a command to the vehicle to navigate to a new waypoint based on the calculated MDF pose of the vehicle.

According to the at least one example, a computer program product is disclosed that includes a computer readable medium that stores instructions which are executable by a computer processor, wherein the instructions of the computer program product include any combination of the examples of the method(s) set forth above and/or any combination of the instructions executable by the one or more processors, as set forth above and herein.

Turning now to the figures, wherein like reference numerals indicate like or similar features and/or functions, an imaging system 10 for guiding a vehicle 12 is shown in FIG. 1. The imaging system 10 is coupled to a structure 14 (e.g., such as a parking garage) and comprises a plurality of electronic depth cameras 16a, 16b, 16c, at least one computer 20 that processes data from the cameras 16a, 16b, 16c, and at least one wireless transceiver 22 used to communicate with the vehicle 12. As will be explained more below, a respective optical axis (Za, Zb, Zc) corresponding to each camera 16a, 16b, 16c is normal to (or plumb with respect to) the ground (or Earth) 24 (e.g., in FIG. 1, each optical axis (Za, Zb, Zc) also is normal to a floor 26 of the structure 14 as well; however, as shown in FIGS. 4A, 4B, 5A, 5B, 6A, and 6B, this is not required in all examples). Imaging system 10 may be useful when a satellite-based positioning signal is too weak to be used successfully by vehicle-navigation equipment (e.g., inside some parking garages). E.g., in these circumstances, available localization data (typically determined by the vehicle's computing systems) may be inadequate to navigate the vehicle 12. Hence, the imaging system 10 may determine suitable localization data on behalf of the vehicle 12. As explained below, camera 16a may capture one or more images that include at least a portion of vehicle 12, and computer 20 (using a deep neural network) may determine a multi-degree-of-freedom (MDF) pose of the vehicle 12—e.g., typically, this is a six-degree-of-freedom (6DOF) pose; however, this quantity is not required. Using the image(s) and this MDF pose information, the computer 20 may determine the vehicle's position in the structure relative to obstacles therein (e.g., such as other vehicles, pillars 28 in the structure 14, etc.), as well as waypoint data by which to instruct the vehicle 12 to navigate. Computer 20 may send a navigation command to the vehicle 12 via the wireless transceiver 22, and the vehicle 12 may move within the structure 14 according to the command. This process may be repeated throughout the field of view (FOV) of camera 16a. And when vehicle 12 enters the FOV of camera 16b, a hand-off may occur, and a similar process may be executed using camera 16b and computer 20—thereby enabling the vehicle 12 to continue to navigate through another region of the structure 14. A more detailed explanation of this process follows a detailed description of the elements shown in FIGS. 1-6B.

Turning to FIG. 1, the illustrated vehicle 12 is a passenger vehicle; however, this is merely one example. Vehicle 12 instead could be a truck, a sports utility vehicle (SUV), a recreational vehicle, a bus, or any other suitable vehicle that comprises an autonomous driving computer. For example, the Society of Automotive Engineers (SAE) (which has defined operation at levels 0-5). More particularly, vehicle 12 may comprise one or more computers (not shown) configured to store and execute logic instructions or sets of instructions embodied in hardware, software, firmware, a combination thereof, or the like to thereby enable vehicle 12 to operate with some user assistance (partial autonomy) or without any user assistance (full autonomy). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), vehicle 12 sometimes assists with steering, acceleration, or braking, but the driver is still responsible for the vast majority of the vehicle control. At level 2 ("partial automation"), vehicle 12 can control steering, acceleration, and braking under certain circumstances without human interaction. At levels 3-5, vehicle 12 assumes more driving-related tasks. At level 3 ("conditional automation"), vehicle 12 can handle steering, acceleration, and braking under certain circumstances, as well as monitoring of the driving environment. Level 3 may require the driver to intervene occasionally, however. At level 4 ("high automation"), vehicle 12 can handle the same tasks as at level 3 but without relying on the driver to intervene in certain driving modes. At level 5 ("full automation"), vehicle 12 can handle all tasks without any driver intervention. In at least one example, the steering control mode of vehicle 12 includes operation of the vehicle 12 at SAE level 5 (operation in a fully autonomous mode)—e.g., at least within structure 14.

Structure 14 is shown as a parking garage having a ceiling 30, a floor 26, and multiple pillars 28 which support the ceiling 30 relative to floor 26. The floor 26 and ceiling 30 may or may not be level with respect to ground 24 and may or may not be parallel to one another. In some examples, such as those shown in FIGS. 4B and 5B, the floor 26 is inclined (e.g., at angles α and β, respectively). Typically, angles α and β are less than or equal to six degrees (e.g., angle α may be 3° and angle β may be 6°); however, these are merely examples. Structure 14 may be supported by pillars 28 or any other design or feature (e.g., including walls, concrete barriers, etc.). In general, structure 14 is design as a vehicle through-way or parking venue—thus, structure 14 may have an entrance (not shown), an exit (not shown), and at least one predetermined route 32 (along the floor 26) connecting the entrance and exit. Other non-limiting examples of structure 14 include an underground passage (e.g., a tunnel or the like), an enclosed depot, and an enclosed terminal facility.

In general, at least some regions of structure 14 may be devoid of a useful satellite-based positioning signal (i.e., absent a satellite-based positioning signal or alternatively, the satellite positioning signal is present but weak). Weak may be defined as being attenuated and being less than a threshold; e.g., the threshold may be below a predetermined value that is usable by vehicle-navigation equipment. According to an example, the satellite-based positioning signal may be a wireless signal from a satellite using global positioning system (GPS), global satellite navigation system (GLONASS), or the like.

According to one example, each of the electronic depth cameras 16a, 16b, 16c may be similar or identical. Therefore, only one (16a) will be described in detail. It should be appreciated that any quantity of electronic depth cameras can be used (three are shown only by way of example).

Electronic depth camera 16a may be any suitable electronic camera which is capable of receiving depth data; i.e., a range between the camera 16a and a surface of an object within the field of view of the camera 16a. One non-limiting example of electronic depth camera 16a is a red-green-blue-depth (RGBD) camera, such as that shown in FIG. 2. For example, camera 16a may comprise a housing 40 that may be couplably fixed to ceiling 30 of structure 14, an optical assembly 42 carried by the housing 40, wherein optical axis Za is the optical axis of optical assembly 42, one or more infrared (IR) emitters 44 (only one is shown for purposes of illustration), and one or more infrared (IR) depth sensors 46 (only one is shown for purposes of illustration). By way of example, the optical assembly 42 may comprise a photo-sensitive array 48 and one or more lens (not shown) within the housing 40 and aligned along the optical axis Za. In operation, the camera 16a determines one or more images (e.g., image frames), and each image frame comprises color information and depth information corresponding to objects within the image frame. For example, the photosensitive array 48 may receive color image data while concurrently the IR emitters 44 and IR depth sensors 46 are used to determine depth image data; and ultimately a processor (not shown) of the camera 16a correlates both color image data and depth image data into an image which is provided to computer 20 (as described below). A couple non-limiting commercial examples of RGBD cameras are the Astra S 3D Camera by Orbbec and the Realsense D435 by Intel; other examples exist. In some implementations of imaging system 10, an RGBD camera is desirable as RGBD cameras typically have a front focal distance (FFD) between 2 and 5 meters (e.g., as opposed to lidar systems which typically have an FFD in the hundreds of meters). Further, RGBD cameras may cost substantially less than lidar systems.

Each of cameras 16a, 16b, and 16c may be mounted to ceiling 30 or other features of structure 14 so that the respective optical axes Za, Zb, Zc are plumb with respect to ground 24. According to one example, cameras 16a, 16b, 16c may be spaced from one another so as to minimize overlap of their respective FOVs. According to the example shown in FIG. 1, when vehicle 12 is centered within the FOV of camera 16a, vehicle 12 is not within the FOVs of cameras 16b and 16c and camera 16a can determined six-degree-of-freedom pose detection. According to another example, the overlap is not minimized. For example, the overlap of the respective FOVs may be up to the length of vehicle 12 (e.g., where there is full coverage of the vehicle 12 at the height thereof). Other overlap examples also exist. Multiple cameras 16a-16c may be electrically coupled to computer 20 (e.g., at least communicatively coupled).

Computer 20 may comprise one or more processors 50 (only one is shown in the diagram for purposes of illustration), memory 52, and a plurality of instructions 54 (by way of example only, software code) which is stored on memory 52 and which is executable by processor(s) 50. Processor(s) 50 may be programmed to process and/or execute digital instructions to carry out at least some of the tasks described herein. Non-limiting examples of processor(s) 50 include one or more of a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. In at least one example, processor(s) 50 read from memory 52 and execute multiple sets of instructions (e.g., including instructions 54) which may be embodied as a computer program product stored on a non-transitory computer-readable storage medium (e.g., such as memory 52). Non-limiting examples of instructions 54 will be described below in the processes illustrated using flow diagrams and described elsewhere herein, wherein these and other instructions may be executed in any suitable sequence unless otherwise stated. The instructions and the example processes described below are merely embodiments and are not intended to be limiting.

Memory 52 may include any non-transitory computer usable or readable medium, which may include one or more storage devices or storage articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 52 may store one or more sets of instructions (e.g., such as instructions 54) which may be embodied as software, firmware, or other programming instructions executable by the processor(s) 50—including but not limited to the instruction examples set forth herein. In operation, processor(s) 50 may read data from and/or write data to memory 52.

Figure 7:
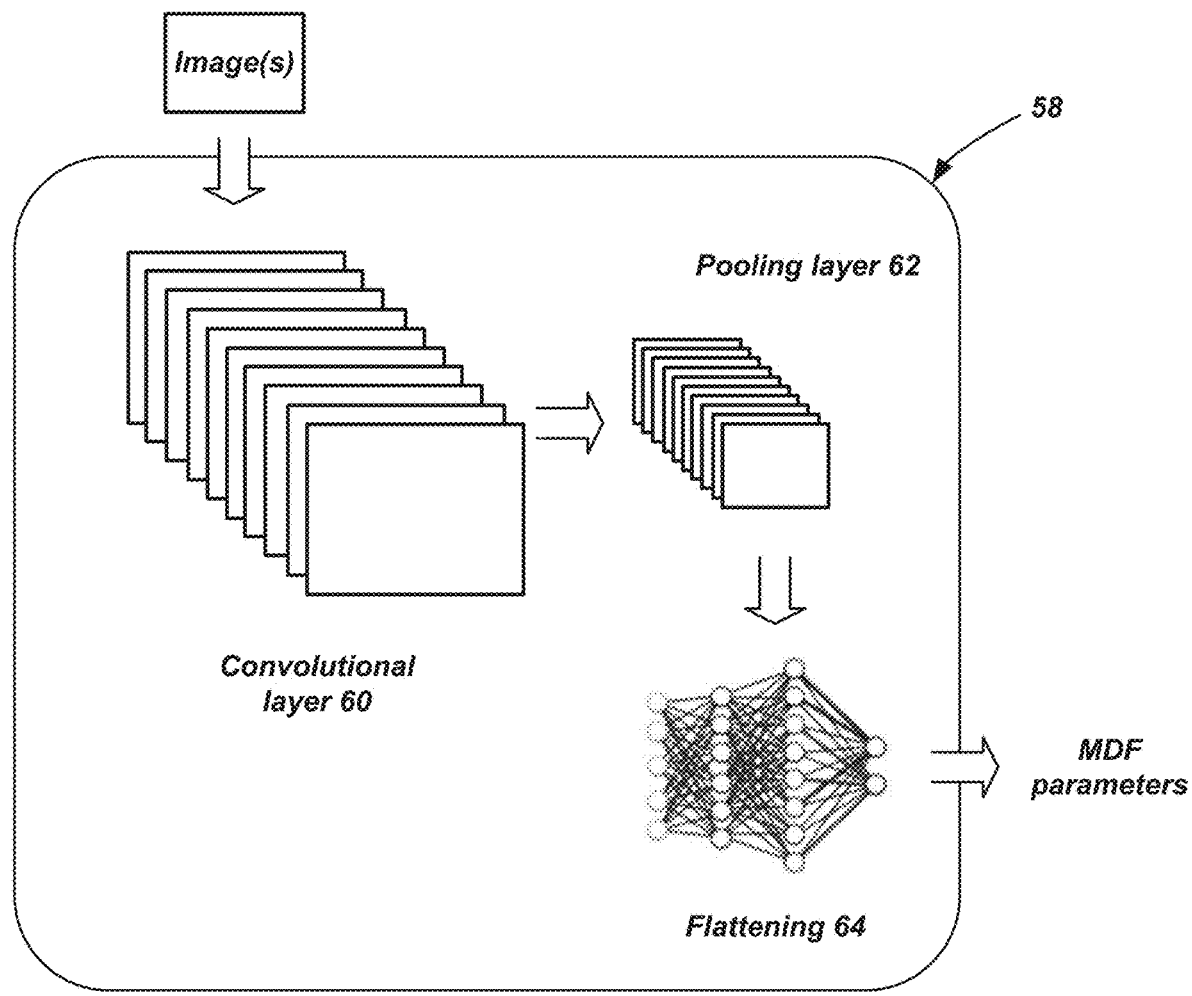
FIG. 7 is a schematic diagram illustrating an example of a deep neural network used to determine multi-degree-of-freedom (MDF) pose of the vehicles shown in FIGS. 4A-6B.

The instructions 54 (stored in memory 52 and executable by processor(s) 50) may comprise any suitable set of instructions for carrying out the methods described herein. As described more fully below, the instructions 54 may include at least one deep neural network 58 (an example is shown in FIG. 7) that determines, from the one or more images, a multi-degree-of-freedom (MDF) pose of vehicle 12. The processor(s) 50 then may execute other instructions 54. E.g., using the MDF pose, processor(s) 50 may determine a two-dimensional (2D) projection of vehicle 12 onto the route 32 (or onto a deviation from route 32). Furthermore, processor(s) 50 may: determine potential interferences of vehicle 12 with objects within the structure 14 (pillars 28, walls, other features) by evaluating spacing of vehicle 12 with respect to such objects and a heading of vehicle 12 with respect to such objects (or projections thereof); determine a path that follows route 32 (or a deviation therefrom) to avoid collisions; determines a centroid of volume of the vehicle; determine a waypoint that corresponds with the centroid of volume; determine another waypoint along the path that avoids collision of the vehicle with other objects; and communicate, using wireless transceiver 22, a command to vehicle 12 to move to the determined waypoint. These are merely examples—and some of which will be explained in greater detail below.

Deep neural network 58 (see FIG. 7) may be a convolutional neural network (CNN) adapted to classify vehicle pose based on the captured color image data and the captured depth image data (e.g., as inputs to the CNN). According to one non-limiting example, deep neural network 58 may comprise a convolutional layer 60, a pooling layer 62, and flattening 64. The convolutional layer 60 may receive image frames and convolve the image frames using a kernel or filter—e.g., yielding a plurality of convolved features. Thereafter, the pooling layers 62 may reduce the spatial size of the convolved features. Typically (although not required), there may exist multiple iterations of convolution followed by pooling. Thereafter, flattening 64 may convert the pooling output to a suitable column vector for input to a neural network, wherein classification occurs (e.g., using at least one predetermined neural network function, e.g., such as SoftMax)—the classification in the instant example pertaining to MDF pose. Other aspects and convolution techniques may be employed as well.

Figure 3A:
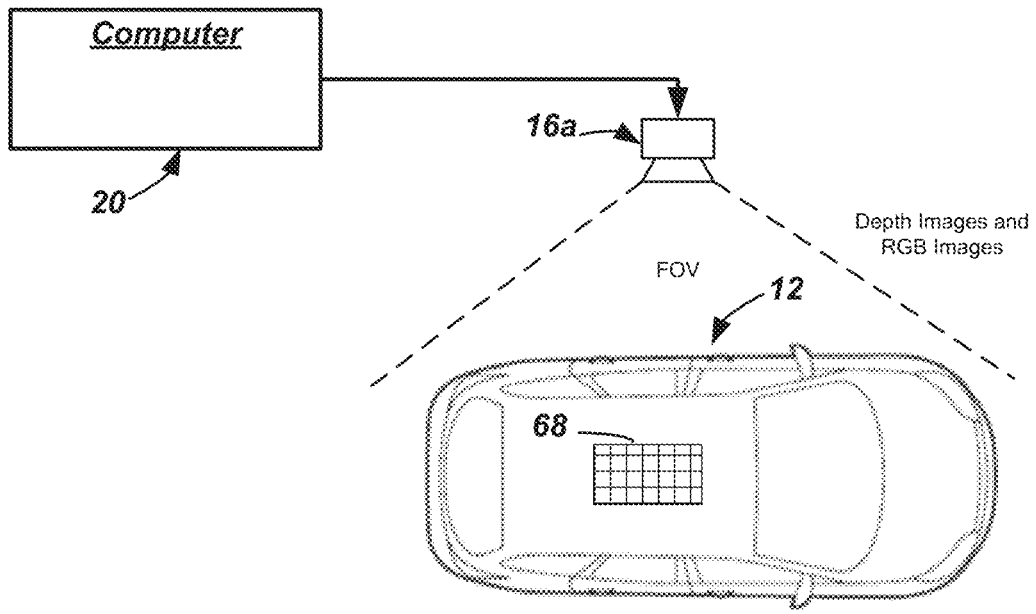
FIG. 3A is a diagrammatic illustration of a vehicle within a field-of-view of a camera, wherein the vehicle includes a fiducial marker for training of the imaging system.

Referring to FIG. 3A, the vehicle 12 may include a fiducial marker 68 disposed on an exterior surface of the vehicle 12 for cross-modal supervision training purposes. For instance, the use of an RGBD camera allows the deep neural network 58 to be trained using cross-modal supervision from RGB to depth without the need for hand-labeled training data. The fiducial marker 68, which is flush with the surface of the vehicle 12 is invisible to the depth camera. Instead, the fiducial marker 68 can be detected in an RGB image, which allows the deep neural network 58 to determine the vehicle's 6 DoF pose relative to the camera 16a during training. The RGB and depth cameras of camera 16a are extrinsically calibrated to each other, which allows the generation of depth images (aligned to the RGB images) and 6 DoF vehicle poses. The depth image and pose pairs are used to train the deep neural network 58.

The fiducial marker 68 functions as a point of reference for the vehicle 12 relative to the camera 16a. Within the environment, the camera 16a can capture both depth image data and camera image data simultaneously. The depth image data can include depth data corresponding to the vehicle 12, and the camera image data can include the RGB image that includes the fiducial marker 68. In various implementations, the fiducial markers 68 may comprise ArUco markers.

The color image data and the corresponding depth image data can be used to train the deep neural network 58. For example, the computer 20 is programmed to determine the six-degree-of-freedom pose for a vehicle 12 using the color image (RGB) data. The computer 20 can determine the six-degree-of-freedom pose using the fiducial marker 68 by determining its position relative to the fiducial sticker 68. Once the position is determined, the corresponding depth image data can be labeled with the determined six-degree-of-freedom pose for training purposes.

In one or more implementations, a coordinate system may be set relative to the camera 16a. The computer 20 may then be programmed to calculate a position of the fiducial marker 68 relative to the coordinate system based on the camera image data. For instance, a position of the fiducial marker 68 can be compared with the coordinate system to determine the MDF pose of the vehicle 12.

Figure 3B:
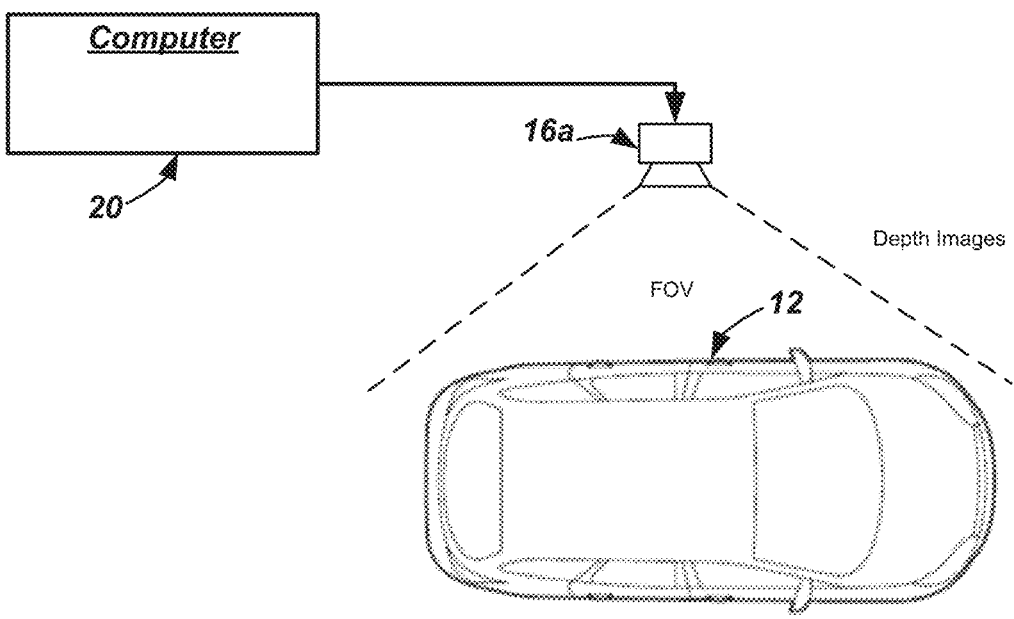
FIG. 3B is a diagrammatic illustration of the vehicle within the field-of-view of the camera, wherein the vehicle does not include the fiducial marker during testing of the imaging system.
Figure 4A:
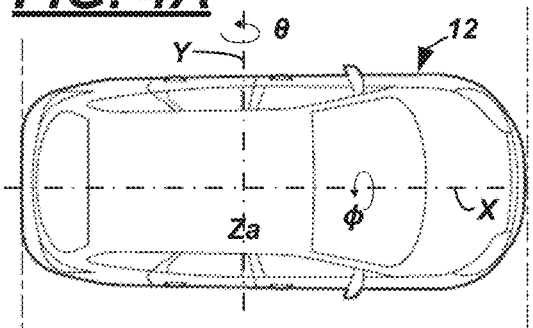
FIGS. 4A-4B are top and elevation view of a vehicle, respectively, wherein a floor beneath the vehicle is at a first inclination (0°).
Figure 4B:
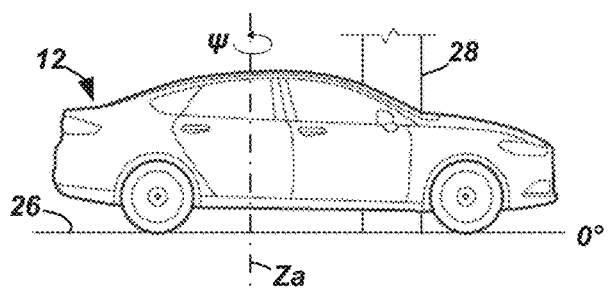
Figure 5A:
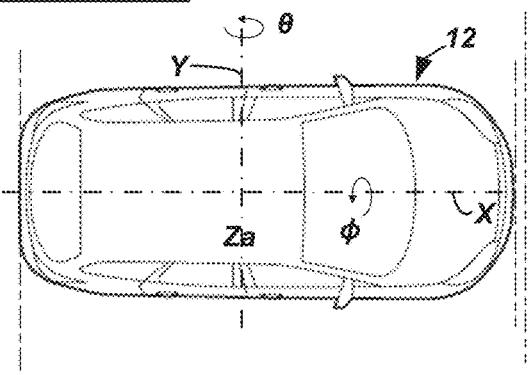
FIGS. 5A-5B are top and elevation view of the vehicle, respectively, wherein a floor beneath the vehicle is at a second inclination (α).
Figure 5B:
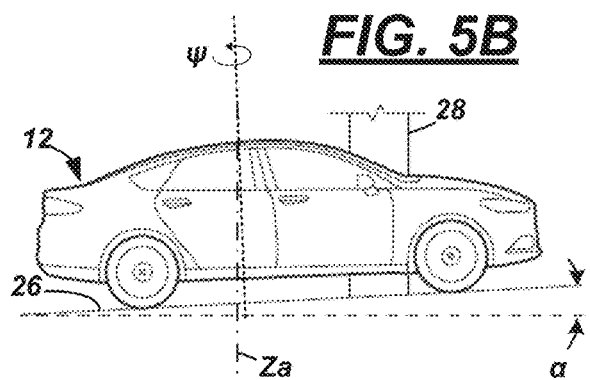
Figure 6A:
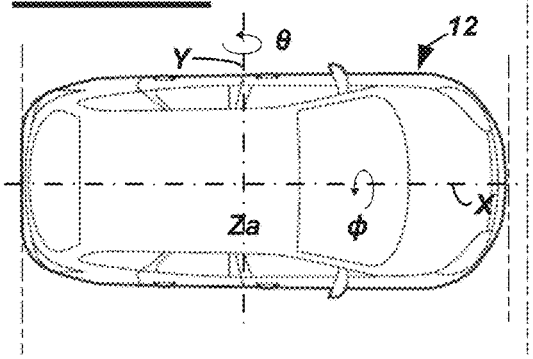
FIGS. 6A-6B are top and elevation view of the vehicle, respectively, wherein a floor beneath the vehicle is at a third inclination (β).
Figure 6B:
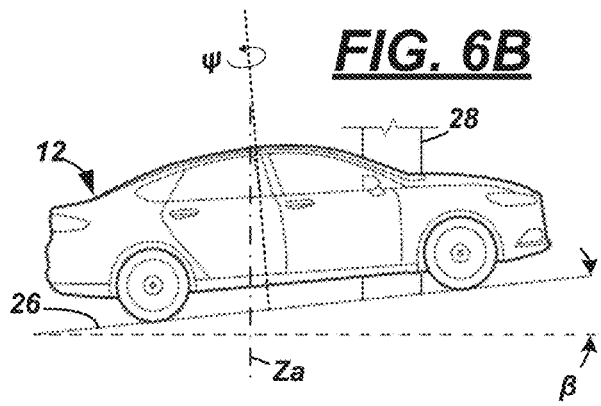

Referring to FIG. 3B, once trained, the fiducial markers 68 can be removed from the vehicle 12, the deep neural network 58 can determine the 6 DoF pose of the vehicle 12 using only the depth image captured by the camera 16a.

Thus, the outputs of the deep neural network 58 may comprise the MDF pose of vehicle 12; e.g., outputs may comprise, each relative a geometric center of vehicle 12, an x-component (x), a y-component (y), a z-component (z), a pitch component ($\theta$), a roll component ($\phi$), and a yaw component ($\psi$), wherein the x-, y-, and z-components are translations according to a Cartesian coordinate system (comprising an X-axis, a Y-axis, and Z-axis (Za)) and the roll, pitch, and yaw components are rotations about X-, Y-, and Z-axes, respectively, wherein the X- and Y-axes represent orthogonal directions used to define the camera's horizontal and vertical fields of view, respectively. Using these values, as will be described in greater detail below, computer 20 may determine a highly-precise position of the vehicle 12 (e.g., with an accuracy of less than +/−3 centimeters). Further, as shown in FIGS. 4A through 6B, the MDF pose also is sufficiently accurate to account for changes in the appearance of the vehicle 12 due to perspective—e.g., from the camera's point of view, the vehicle 12 shown in FIG. 4A appears shorter in length than the vehicle 12 shown in FIG. 5A, and the vehicle 12 shown in FIG. 6A appears shorter in length than the vehicle 12 shown in FIG. 5A.

While not shown, imaging system 10 may comprise multiple computers 20. E.g., such computers 20 may be networked together so computational tasks can be balanced and allocated as required.

Returning to FIGS. 1 and 2, wireless transceiver 22 may comprise a wireless chipset and matched antenna that facilitates short-range wireless communication links using protocols such as Bluetooth, Bluetooth Low Energy (BLE), Wi-Fi, Wi-Fi Direct, etc. Further, wireless transceiver 22 may be fixed to structure 14 and communicatively coupled to computer 20. In this manner, wireless transceiver 22 may be able to receive requests from vehicle 12 and pass them to computer 20 and/or receive commands from computer 20 and communicate the commands to vehicle 12.

While not shown, imaging system 10 may comprise multiple wireless transceivers 22. E.g., one or more wireless transceivers 22 may be respectively, communicatively coupled to a local computer 20. Spacing of the wireless transceivers 22 may be based upon signal strength within a predetermined region of the structure 14 and/or other factors.

In at least one example, imaging system 10 further may comprise a satellite-based positioning receiver 70 (FIG. 2) in communication with computer 20. In this manner, using the receiver 70, computer 20 may determine whether a satellite-based positioning signal is unsuitable (e.g., too attenuated) or is absent altogether. This aspect of system 10 is optional.

Figure 8:
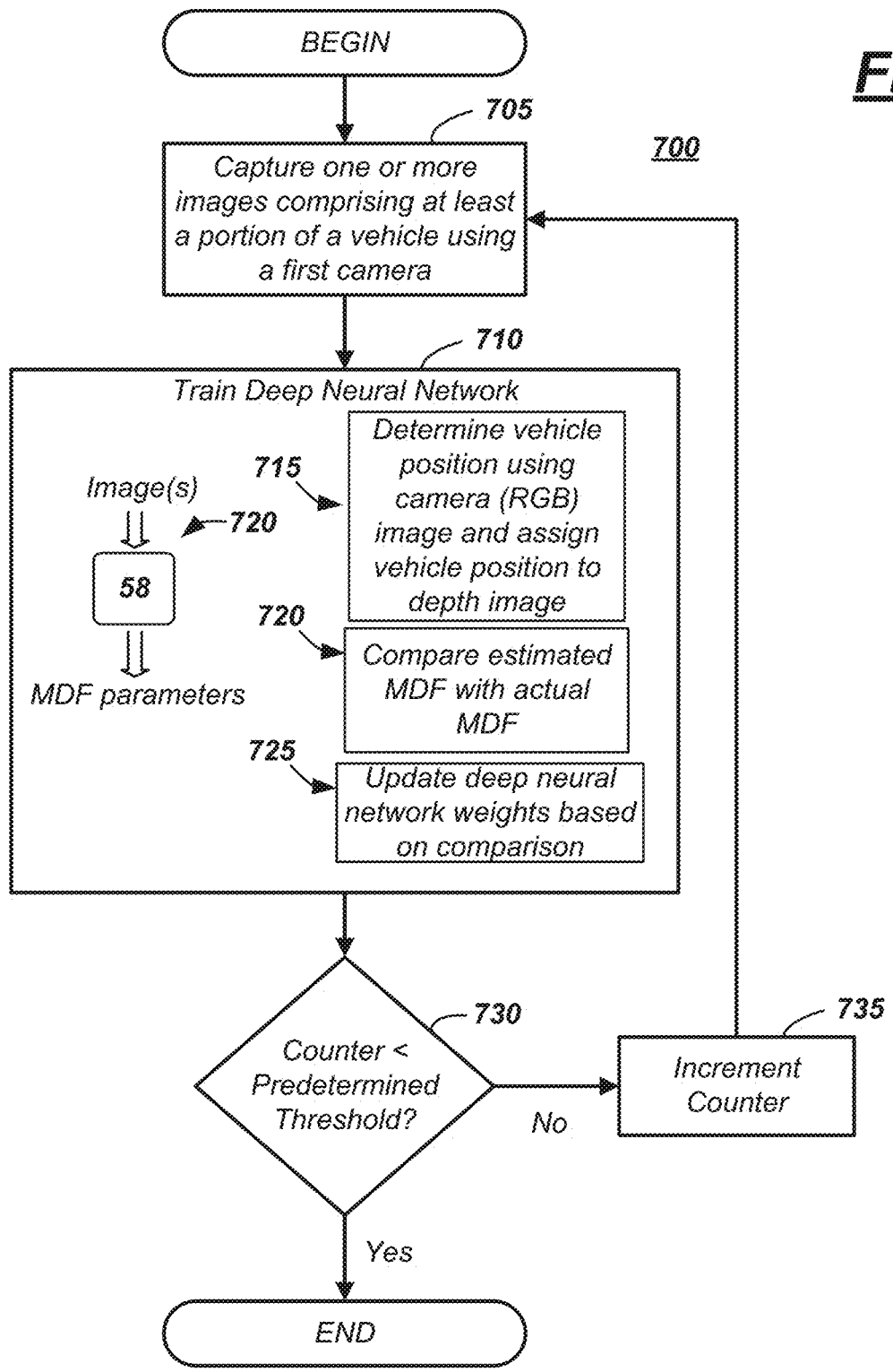
FIG. 8 is a flow diagram illustrating a process of training a deep neural network.

Turning now to FIG. 8, a flow diagram is shown that illustrates an example process 700 of training the deep neural network 58. The process 700 comprises software instructions executable by computer 20 (e.g., executable by the one or more processors 50 stored in memory 52). Non-limiting examples of software instructions are illustrated as instructional blocks in the diagram. It will be appreciated that while not necessarily explained explicitly in process 700, other software instructions may be carried out as well. In some instances, process 700 may comprise steps not executed by computer 20, but by other objects, devices, other computers, etc.

Process 700 may begin at block 705, camera 16a may capture one or more images comprising at least a portion of vehicle 12. As described above, the one or more images may comprise both camera image data and depth image data that corresponds with features in the camera image data. It should be appreciated that, in at least this example, vehicle 12 may be positioned only within the FOV of camera 16a—e.g., not within the respective FOVs of camera 16b, camera 16c, nor any other imaging device which contributes to process 700. Accordingly, as will be apparent from the remainder of the description, multi-degree-of-freedom (MDF) pose may be determined using a single camera.

In block 710, computer 20 trains the deep neural network 58. As shown in FIG. 8, block 710 may include subblocks 715, 720, 725, and 735.

With regard to subblock 715, computer 20 determines the MDF pose based on camera image data. The camera image data includes the fiducial marker 68 such that computer 20 can calculate the MDF pose of the vehicle 12 relative to the camera 16a. During training, the calculated MDF pose is assigned as a label to the corresponding depth image data. The labeled depth image data can then be used to train the deep neural network 58.

With regard to subblock 720, computer 20, using deep neural network 58, may estimate the MDF pose using depth image data from camera 16a. In this instance, deep neural network 58 receives depth image data from camera 16a. The depth image data can be provided to an input layer of the CNN and an output layer estimates the MDF pose in the format of a plurality of components (e.g., an x-component (x), a y-component (y), a z-component (z), a pitch component ($\theta$), a roll component ($\phi$), and a yaw component ($\psi$), wherein the x-, y-, and z-components are translations according to a Cartesian coordinate system (comprising an X-axis, a Y-axis, and a Z-axis) and the roll, pitch, and yaw components are rotations about X-, Y-, and Z-axes, respectively). In another example, the plurality of components consist of the x-component (x), the y-component (y), and the yaw component ($\psi$). Other outputs are also possible.

In subblock 720, computer 20 compares the estimated MDF determined by the deep neural network 720 with the actual MDF, e.g., actual MDF obtained from labeled data.

In subblock 725, one or more weights of the deep neural network 58 are updated based on the comparison for training and/or testing purposes. In block 730, a determination is made of whether a counter is less than a predetermined threshold. The predetermined threshold may comprise a number of epochs set to train the deep neural network 58. If the counter is less than the predetermined threshold, the counter is incremented at block 735. The process 700 then returns to block 705. Otherwise, the process 700 ends.

Figure 9:
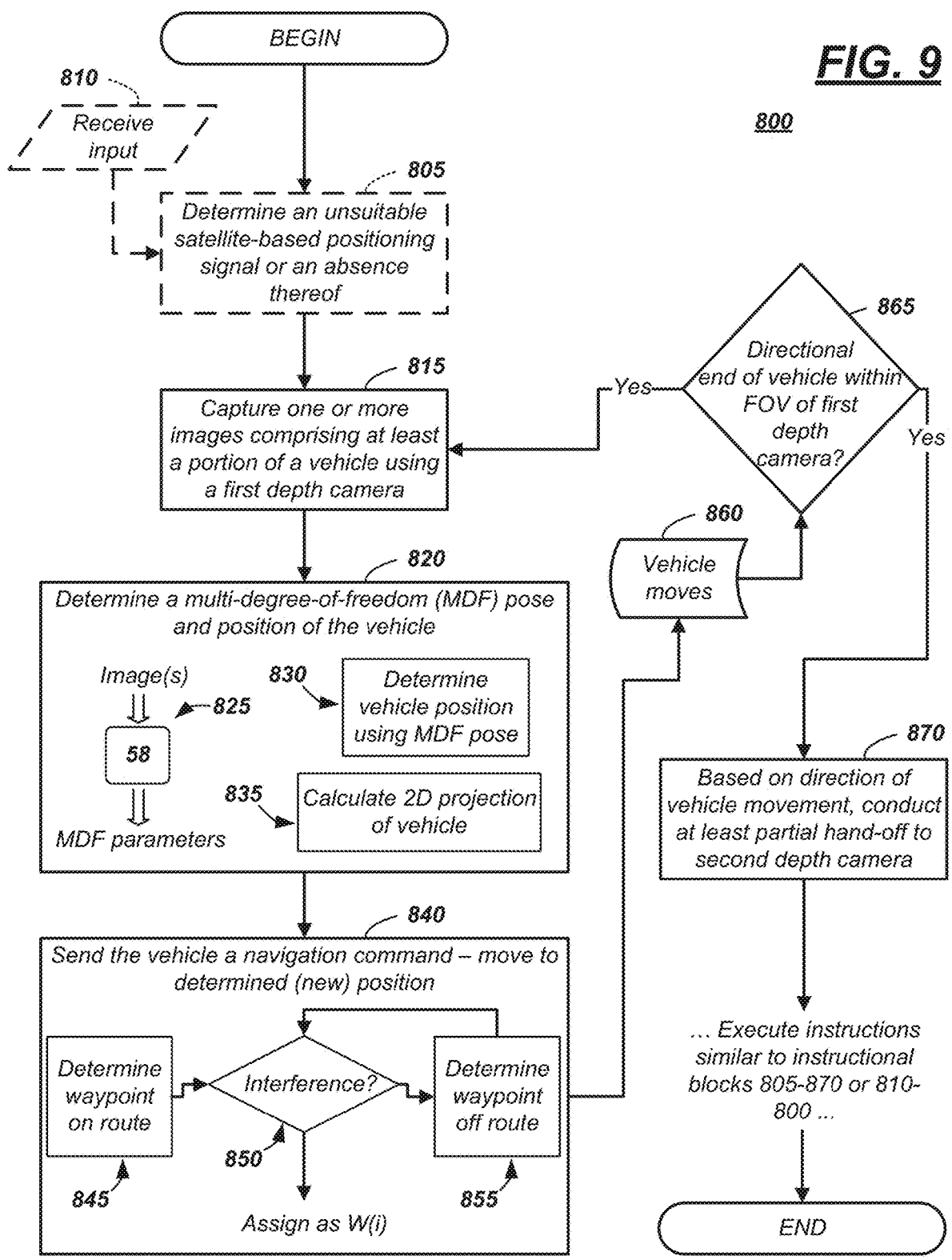
FIG. 9 is a flow diagram illustrating a process of using the imaging system (shown in FIG. 1) to guide a vehicle, wherein the process includes, among other things, determining a multi-degree-of-freedom (MDF) pose of the vehicle.

Turning now to FIG. 9, a flow diagram is shown that illustrates an example process 800 of providing localization data from the imaging system 10 to the vehicle 12. Localization data, among other things, may be defined as information required by the vehicle 12 to move without collision in an autonomous mode (e.g., in at least one instance, in a fully autonomous mode). The process 800 comprises software instructions executable by computer 20 (e.g., executable by the one or more processors 50 stored in memory 52). Non-limiting examples of software instructions are illustrated as instructional blocks in the diagram. It will be appreciated that while not necessarily explained explicitly in process 800, other software instructions may be carried out as well. In some instances, process 800 may comprise steps not executed by computer 20, but by other objects, devices, other computers, etc.

Process 800 may begin at block 805, wherein an unsuitable satellite-based positioning signal or an absence thereof is determined. This may occur in a variety of ways. According to one example, prior to installation of the imaging system 10, test equipment or other devices may determine an absence or weakness of a satellite-based positioning signal in the structure 14, and thereafter technicians may install the system 10 in structure 14 foreseeing a vehicle need for localization data. In another example, using receiver 70, computer 20 may determine that a satellite-based positioning signal is less than a threshold (e.g., less than a predetermined value—e.g., a value in which GPS receivers ignore any signal). According to another example, computer 20—via wireless transceiver 22 (block 810)—receives a request for localization data from the vehicle 12 (e.g., presumably because GPS or GLONASS data is unavailable). For example, vehicle 12 may detect that no satellite-based positioning signal (which is above the threshold) is available and in response to this detection, query the imaging system 10 via a short-range wireless communication link (e.g., such as Bluetooth, Wi-Fi, etc.). According to yet another example, computer 20 may detect the proximity of vehicle 12 and offer to provide it localization data (e.g., based on a presumed need to assist the vehicle 12) and the vehicle 12 may acknowledge and positively respond (another example of block 810). In at least one example, block 705 is omitted (e.g., block 805 is optional).

In block 815 which may follow, camera 16a may capture one or more images comprising at least a portion of vehicle 12. As described above, the one or more images may comprise both camera image data and depth image data that corresponds with features in the camera image data. It should be appreciated that, in at least this example, vehicle 12 may be positioned only within the FOV of camera 16a—e.g., not within the respective FOVs of camera 16b, camera 16c, nor any other imaging device which contributes to process 800. Accordingly, as will be apparent from the remainder of the description, multi-degree-of-freedom (MDF) pose may be determined using a single camera.

In block 820 which follows, computer 20 determines the MDF pose and position of vehicle 12. As shown in FIG. 9, block 820 may include subblocks 825, 830, and 835.

With regard to subblock 825, computer 20, using deep neural network 58, may determine the MDF pose using image data and depth data from camera 16a (in one example, MDF pose is determined using only image and depth data from camera 16a). For example, deep neural network 58 may be a trained convolutional neural network (CNN). In this instance, deep neural network 58 receives at least one image from camera 16a into an input layer of the CNN and based on its training, an output layer yields the MDF pose in the format of a plurality of components (e.g., an x-component (x), a y-component (y), a z-component (z), a pitch component ($\theta$), a roll component ($\phi$), and a yaw component ($\psi$), wherein the x-, y-, and z-components are translations according to a Cartesian coordinate system (comprising an X-axis, a Y-axis, and a Z-axis) and the roll, pitch, and yaw components are rotations about X-, Y-, and Z-axes, respectively). In another example, the plurality of components consist of the x-component (x), the y-component (y), and the yaw component ($\psi$). Other outputs are also possible.

In at least some examples, the deep neural network 58 also classifies the floor 26 and uses a determination of floor inclination to assist in determining the MDF pose. For example, when vehicle 12 is on an upward slant, the depth data of the floor 26 in front of the vehicle 12 will have smaller values than depth data of the floor 26 behind the vehicle 12. The slant of floor 26 may correspond with the pitch or roll of vehicle 12 with respect to ground 24.

In at least one example, the deep neural network 58—using the one or more images—further classifies other objects as well. For example, computer 20 may classify obstacles (e.g., other vehicles, walls, barriers, etc.) within the structure 14. In one example, deep neural network 58 may use a single CNN (e.g., which classifies both MDF pose and other obstacles); in other examples, deep neural network 58 uses multiple CNNs (e.g., one for MDF pose, one for obstacles, etc.). As discussed below, in this manner, computer 20 may determine a path which will enable vehicle 12 to navigate without interferences or collision.

In subblock 830, computer 20 may determine the vehicle's position. According to one aspect, this may include determining a centroid of volume of vehicle 12 using the MDF pose. The centroid of volume can be determined in various ways. According to at least one example, using the depth data of the one or more images, computer 20 may determine a three-dimensional (3D) bounding box around the vehicle and then calculate a geometric center. The geometric center may be an origin with respect to the X-, Y-, and Z-axes (however, this is not required). For example, a translation in x- or y-directions and/or any yaw may be determined relative to the centroid of volume.

According to an example of subblock 830, the MDF pose data also may be used to correct any perspective-induced error from the point of view of the camera 16a. For example, recall that camera 16a is aligned along a vertical optical axis (plumb to ground 24) and consider FIGS. 5A-6B, wherein the vehicle 12 is not parallel to ground 24. Without MDF pose, a true length of the bounding box of the vehicle 12 may not be determined (as illustrated). MDF pose similarly can be used to accurately represent the dimensions of the bounding box when the vehicle 12 is not directly below the camera 16a (e.g., off-axis)—e.g., whether the vehicle 12 is parallel to ground 24 or not.

According to an example of subblock 835, computer 20 further may calculate a center of a 2D projection—by projecting the centroid of volume into a 2D footprint of the vehicle 12 (e.g., a plane coincident with the floor 26). And using the MDF pose parameters, a translation in x- or y-directions and/or any yaw may be determined relative to the 2D projection of the centroid of volume. In this instance, the center of the 2D projection may be considered the vehicle's current position (e.g., it also can be characterized as a waypoint $W_0$). Note: without MDF pose, error may be induced with respect to the accuracy of the center of the 2D projection as well. In at least one example, accuracy of the center of the 2D projection may be less than 10 centimeters; in another example, accuracy of the center of the 2D projection may be less than 5 centimeters.

The computer 20 in block 840 (which follows) may send—via wireless transceiver 22—a navigation command to move vehicle 12 to a new position within the structure 14. Block 840 may comprise subblocks 845, 850, and 855.

According to an example of subblock 845, computer 20 first may determine a proposed waypoint for vehicle 12. This waypoint may be a point along predetermined route 32 in a desired direction of travel—recall: by which vehicle 12 may move through the structure 14.

In subblock 850, computer 20 may determine whether an interference exists between the 2D projection of vehicle 12 and the proposed waypoint. If no interference exists, computer 20 may accept the waypoint (e.g., assign the waypoint value as W(i)). Further, computer 20 may send a navigation command to vehicle 12 that includes waypoint W(i).

However, if an interference is determined, then computer 20 (in subblock 855) may determine a proposed waypoint for vehicle which is not along the predetermined route 32 (e.g., a deviation therefrom). Following subblock 855, this proposed waypoint may be evaluated by subblock 850. If no interference exists, computer 20 may assign this proposed waypoint as W(i) and send a navigation command to vehicle 12 that includes waypoint W(i). However, if interference exists, process 800 may proceed again to subblock 855 to determine a different proposed waypoint. This process may be repeated until a suitable path is determined. Thus, for any given segment of the path of vehicle 12 through the structure 14, the path overlays the predetermined route 32 when no interference exists and the path deviates from the predetermined route 32 when an interference is determined.

Block 840 further may comprise computer 20 determining a vector between waypoint $W_0$ and waypoint W(1) and communicating this to vehicle 12. A vector comprises a direction and magnitude; and each determined magnitude may be referred to as a segment of the path. While not limited herein, a typical magnitude between waypoints is one to two meters.

In block 860 which follows, the vehicle 12 moves in response to the command of block 740.

Block 865 follows. In block 865, computer 20 may determine whether a directional end of vehicle 12 remains within the FOV of camera 16a. A directional end of a vehicle may refer to a longitudinal end (e.g., one of the front end or the rear end) of the vehicle 12 which is in the direction the vehicle 12 is moving (e.g., in accordance with the vector). E.g., if the vehicle 12 is in DRIVE, then the front end is the directional end and if the vehicle 12 is in REVERSE, then the rear end is the directional end. For example, as the FOV of camera 16a and the FOV of camera 16b minimally, if at all, overlap, at some point the directional end of vehicle 12 will be in the FOV of camera 16b while an opposite end still may be in the FOV of camera 16a. When this occurs, process 800 may proceed to block 870. However, if the directional end of vehicle 12 remains within the FOV of camera 16a, then process 800 may loop back to block 815 and repeat some or all of the blocks 815-865 (e.g., including the respective subblocks thereof).

In block 870, based on a direction of vehicle movement, computer 20 may conduct an at least partial hand-off to camera 16b. In one example, when the directional end is within the FOV of camera 16b, computer 20 re-initiates process 800 (e.g., executing instructions similar to instructional blocks 805-870 or instructional blocks 810-870). In other examples, concurrently computer 20 may process images from both cameras 16a and 16b until more of the vehicle 12 moves into the FOV of camera 16b (or until the vehicle 12 is no longer in the FOV of camera 16a). In some instances, following block 870, the process may end.

Other examples also exist. For instance, according to one non-limiting example, blocks 830 and 835 utilize a centroid of volume; however, this is not required in all examples. In another example, a so-called four-corners technique may be employed (using the four corners of the vehicle 12). Still other ways of determining a vehicle footprint can be used instead or in combination with the aforementioned techniques.

Thus, there has been described an imaging system and a technique for using the imaging system to navigate a vehicle through a region that is denied satellite-based positioning signals. The imaging system may comprise multiple electronic depth cameras and a computer that communicates with the vehicle, as well as the depth cameras. In at least one example, the electronic depth cameras are red-green-blue-depth (RGBD) cameras. When the vehicle is positioned within a field of view of one of the cameras, the respective camera may acquire one or more images and provide them to the computer. In turn, the computer may use a deep neural network to determine a multi-degree-of-freedom pose of the vehicle. Thereafter, using the multi-degree-of-freedom pose and/or other image data determined from the one or more images, the computer may send a wireless message to the vehicle instructing it to move (e.g., point-to-point).

In general, the computing systems and/or devices described may employ any of a number of computer operating systems, including, but by no means limited to, versions and/or varieties of the AppLink/Smart Device Link middleware, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the Black-Berry OS distributed by Blackberry, Ltd. of Waterloo, Canada, and the Android operating system developed by Google, Inc.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, Python, etc. Some of these applications may be compiled and executed on a computing machine, such as the so-called Java Virtual Machine, the so-called Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Where databases, data repositories or other data stores are described herein, these may include various kinds of mechanisms for storing, accessing, and retrieving various kinds of data, including a hierarchical database, a set of files in a file system, an application database in a proprietary format, a database management system (DBMS), etc. Each such data store is generally included within a computing device employing a computer operating system such as one of those mentioned above and are accessed via a network in any one or more of a variety of manners. A file system may be accessible from a computer operating system and may include files stored in various formats. A DBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., wearable devices, servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method of providing localization data to a vehicle, comprising:
capturing, from a first electronic depth camera, one or more images, wherein the one or more images include at least a portion of the vehicle; and
using a deep neural network and the one or more images, determining a multi-degree of freedom (MDF) pose of the vehicle,
wherein an optical axis of the first electronic depth camera is oriented along a Z-axis according to a Cartesian coordinate system (comprising an X-axis, a Y-axis, and the Z-axis), wherein the Z-axis is plumb with respect to Earth.

2. The method of claim 1, further comprising determining an indication of a weak satellite-based positioning signal or an absence thereof, wherein determining the indication comprises receiving a request for the localization data from the vehicle.

3. The method of claim 1, further comprising sending a command to the vehicle to navigate to a new waypoint.

4. The method of claim 1, wherein the camera is a red-green-blue-depth (RGBD) camera.

5. The method of claim 1, wherein the deep neural network is a convolutional neural network (CNN).

6. The method of claim 5, wherein an input layer of the CNN receives the one or more images, wherein an output layer of the CNN yields the MDF pose.

7. The method of claim 1, wherein the MDF pose comprises an x-component (x), a y-component (y), a z-component (z), a pitch component ($\theta$), a roll component ($\phi$), and a yaw component ($\psi$), wherein the x-, y-, and z-components are translations according to a Cartesian coordinate system (comprising an X-axis, a Y-axis, and a Z-axis) and the roll, pitch, and yaw components are rotations about X-, Y-, and Z-axes, respectively.

8. The method of claim 7, wherein determining the MDF pose further comprises determining a centroid of volume of the vehicle using the one or more images, wherein the centroid of volume is a geometric center of a body of the vehicle.

9. The method of claim 8, wherein determining the MDF pose further comprises determining a current waypoint of the vehicle.

10. The method of claim 9, wherein the command to navigate is determined based the current waypoint and a new waypoint, wherein the new waypoint is based on a predetermined vehicle route through a structure.

11. The method of claim 9, further comprising calculating, using the centroid of volume, a center of a two-dimensional (2D) projection of the vehicle onto a floor of a structure and assigning a location of the center to be a current waypoint.

12. The method of claim 11, wherein a new waypoint is based on an absence of interference of the 2D projection with obstacles within a field of view of the first electronic depth camera.

13. The method of claim 9, further comprising handing off the vehicle to a second electronic depth camera in a structure which has a field of view that is different than the first electronic depth camera, wherein the first electronic depth camera determines the MDF pose (using the deep neural network) independent from the second electronic depth camera determining (using the deep neural network) a new MDF pose.

14. The method of claim 1, further comprising:
calculating the MDF pose of the vehicle based on a camera image, wherein the camera image includes data indicative of a fiducial marker positioned on an exterior surface of the vehicle; and
assigning a label to a corresponding depth image, wherein the label comprises the calculated MDF pose of the vehicle.

15. An imaging system for guiding a vehicle, comprising:
a first red-green-blue-depth (RGBD) camera comprising a housing couplably fixed to a structure and an optical assembly carried by the housing, wherein an optical axis of the optical assembly is oriented normal to ground, wherein the first RGBD camera is located in a region that is absent a satellite-based positioning signal or the satellite positioning signal is attenuated less than a threshold, wherein the first RGBD camera is oriented along a vertical axis;
a wireless transceiver; and
a computer communicatively coupled to the first RGBD camera and the transceiver, wherein the computer comprises one or more processors and memory storing instructions executable by the one or more processors, wherein the instructions comprise to:
(a) identify a vehicle to which to provide localization data;
(b) capture, via the first RGBD camera, one or more image frames of the vehicle;
(c) using a deep neural network and the one or more image frames of the RGBD camera, determine a multi-degree of freedom (MDF) pose of the vehicle;
(d) using the MDF pose, determine a new waypoint for the vehicle; and
(e) transmitting, via the transceiver, a command to the vehicle to navigate to the new waypoint.

16. The system of claim 15, wherein the satellite-based positioning signal comprises global positioning system (GPS) or global satellite navigation system (GLONASS), wherein the threshold is below a predetermined value.

17. The system of claim 15, wherein the instructions further comprise to: using the MDF pose, determine a centroid of volume of the vehicle; and using the centroid of volume, determine the new waypoint for the vehicle, wherein the centroid of volume is a geometric center of a body of the vehicle, wherein determining the centroid of volume is within an accuracy of less than 5 centimeters.

18. The system of claim 15, further comprising a plurality of additional RGBD cameras, wherein, when the vehicle passes within the respective fields of view each of the first RGBD camera and the plurality of RGBD cameras, the one or more processors execute instructions (a)-(e).

19. A method for cross-modal supervision, comprising:
- capturing, from a first electronic depth camera, a depth image and a red-green-blue image, wherein the depth image and a red-green-blue image includes at least a portion of a vehicle, wherein the red-green-blue image includes a depiction of fiducial marker positioned on an exterior surface of the vehicle;
- calculating a multi-degree of freedom (MDF) pose of the vehicle based on the red-green-blue image;
- assigning a label to the depth image, wherein the label comprises the calculated MDF pose of the vehicle; and
- training a deep neural network with the labeled depth image.

20. The method of claim 19, further comprising:
- receiving a non-labeled depth image that includes at least a portion of a vehicle; and
- calculating a multi-degree of freedom (MDF) pose of the vehicle based on the non-labeled depth image; and
- sending a command to the vehicle to navigate to a new waypoint based on the calculated MDF pose of the vehicle.

* * * * *